Aug. 29, 1967 J. W. TAUGNER 3,339,028
ARRANGEMENTS FOR DETECTING GROUND CONDITIONS ON TELEPHONE LINES
Filed Aug. 28, 1964
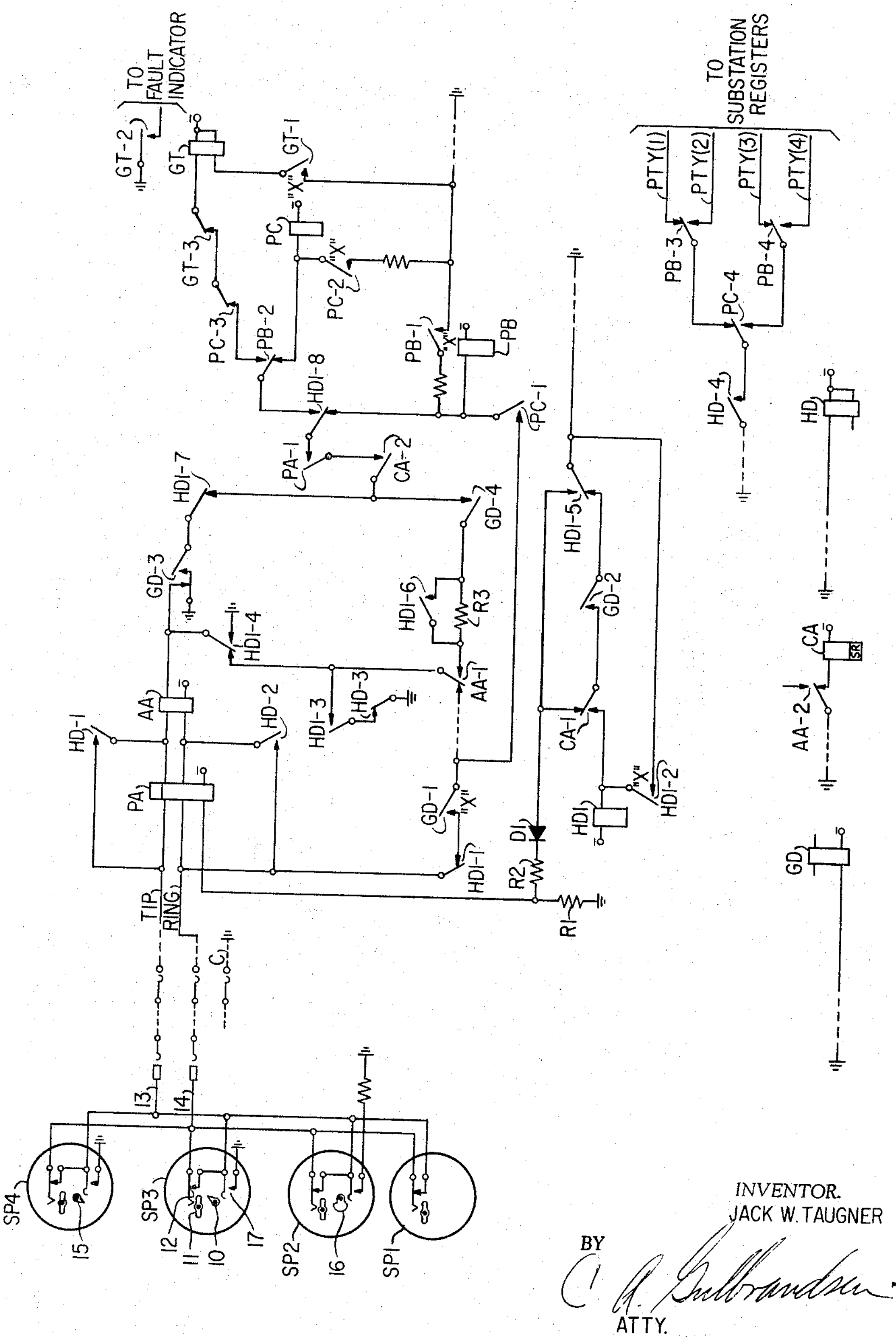
INVENTOR.
JACK W. TAUGNER
BY C. A. Gulbrandsen
ATTY.

United States Patent Office 3,339,028

Patented Aug. 29, 1967

3,339,028
ARRANGEMENTS FOR DETECTING GROUND CONDITIONS ON TELEPHONE LINES

Jack W. Taugner, Mount Prospect, Ill., assignor to Automatic Electric Laboratories, Inc., Northlake, Ill., a corporation of Delaware Filed Aug. 28, 1964, Ser. No. 392,768
9 Claims. (Cl. 179—17)

This invention relates to arrangements for detecting ground conditions on telephone lines and more particularly for detecting such ground conditions in connection with the identification of calling substations on lines of automatic telephone systems, for example for the purpose of automatically ticketing toll calls. The detecting equipment may be provided in any of a number of locations in the switch train. The detecting equipment may, for instance, be provided in a tributary office or it may be part of the ticketer circuit.

The detecting arrangement of this invention may be considered to be an improvement of the automatic toll ticketing telephone system disclosed in Patent 3,136,857 issued to E. J. Glenner on June 9, 1964, or of the party line identification system shown in Patent 3,140,353 issued to B. Sherstiuk on July 7, 1964. In either of these detecting arrangements an auxiliary battery, referred to as the "spotter battery," is required in addition to the central office battery proper.

While the detecting arrangements shown in the above patents are generally satisfactory, the need for a separate battery entails certain disadvantages. For one thing, this auxiliary battery adds to both the initial costs and the maintenance costs of the installation. For another, in the known detecting circuits employing a "spotter battery" the subscriber line is unbalanced and, therefore, subject to noise. Furthermore, it has been found that the use of a spotter battery in series with the central battery tends to bring about "permanent" signals resulting in the firing at about −100 volts of the cold cathode tubes used in substations equipped with negative biased ringers—as employed on lines using superimposed ringing.

The detecting and identifying arrangement of the present invention is applicable, for instance, in connection with any party line in which one of the substations has a regular dial with only loop closing contact springs, while the remaining substations have dials that are further equipped with cam-operated spring contacts which apply an identifying ground to the line at predetermined times of the dial impulse series. In the embodiment disclosed hereafter the invention will be described as a four-party line such as shown in the above-mentioned Glenner Patent 3,136,857 wherein the second substation is identified by resistance ground applied through dial operated shunt springs to the tip conductor, and wherein furthermore the third and fourth substations employ spotter dials of the type described in Patent 2,822,424 issued to J. E. Ostline on Feb. 4, 1958. In this Ostline patent there is disclosed an angularly adjustable cam arrangement whereby, with respect to the timing of the regular loop-controlling contacts, the cam drives the auxiliary spring contacts so that for the third substation ground is applied in a designated open loop period and lasts into the following closed loop period, whereas for the fourth substation ground is applied in a predetermined closed loop period and lasts into the following open loop period.

The principal object of this invention is to provide an improved circuit arrangement whereby grounded line conditions on telephone lines are detected without the aid of an auxiliary battery additional to the regular exchange battery.

Another object of this invention is to provide a ground detecting arrangement wherein the line has a balanced battery feed from the exchange battery at all times except while the detector performs an initial test for a grounded condition on the subscriber line.

It is a feature of this invention to provide as the ground detecting means a polarized relay with two line windings whose connection to the line is altered in testing for ground conditions on the line.

According to another feature of this invention the detector tests the line in two periods, of which the first occurs during the first opening of the line loop as detected by the line relay, while the second period begins with the following closing of the line loop and lasts until the end of an impulse series.

Another feature of this invention is a circuit arrangement whereby the detector detects a steady line ground condition, such as due to a faulty line, as well as a momentary line ground, such as due to a station-identifying ground connection, during the first test period, and the detector is able to distinguish between these two conditions.

In the embodiment of the invention disclosed herein, prior to the first test period, test initiating means has operated and prepared circuitry whereby the line relay, in restoring responsive to the first opening of the loop, transfers the polarized relay from the normally balanced line loop circuit to an unbalanced circuit in which the two differential line windings of the relay are now arranged in a series aiding connection, thereby preparing this relay to test the line for ground conditions.

As a further feature of the testing arrangement, the operation of the polarized relay at this time conditions a circuit for the registration of a faulty line condition, indicating that the line cannot be used for positive party identification. If, however, in the second test period the polarized relay fails to detect the line ground condition, the fault registration is disabled and the ground first detected is interpreted as due to a party identification ground received from one of the substations.

According to another feature of the detecting arrangement the above-mentioned test-initiating means increases the sensitivity of the polarized relay by aiding the bias of its third winding, and inserts a resistive means into the balanced line loop circuit before the relay is transferred into the unbalanced circuit. As a result of these operations the line relay is made faster to release in response to the first opening of the line loop and furthermore the polarized relay is made faster to operate upon detecting a ground condition on the line under test after it has been switched into the unbalanced circuit by contacts of the line relay.

As a further feature of the detecting arrangement the sensitivity of the polarized relay is maintained during the above-mentioned second testing period during which the relay is again in a balanced circuit to test for momentary ground conditions applied by substations connected to the line. Thus, in the last-mentioned arrangement the polarized relay, having first and second differentially balanced windings, is momentarily operated by a "spotter" ground detected on the line. Under this condition, the sensitized third winding aids that one of the two differential line windings which is not shorted or shunted by ground.

According to another feature of this invention the polarized relay detector is disabled, by a test-finished relay operated at the end of the second test period, by shunting of the first and second differential windings of the relay. The operated test-finished relay makes the identification of the calling substation corresponding to the particular operated identification relays effective.

Other objects and features of this invention will become apparent from a perusal of the detailed description of the invention which follows. Illustrating one embodiment of the present invention is a single figure of the drawings showing in schematic form the relationship of the circuit components.

The main body of the drawing shows central office equipment which preferably becomes switched into connection with a subscriber line over which a party is making a call, such as a ticketed toll call, for example, by means of an automatic switch train. The train, not shown, may be any one of the well known switch trains which will directly connect a "tip" designated lead to one line conductor 13, and a "ring" lead to the other conductor 14, of the line. The telephone line may be a party line to which is connected a number of subscriber substations having dials designated SP1 to SP4, from which any of the parties 1 to 4, respectively, are establishing the above-mentioned call. Specific details regarding the dials and their cam spring arrangements will be described later in this specification.

The central office equipment comprises the following apparatus: polarized relay PA having differentially wound and normally opposing first and second windings which are connected to the line loop upon seizure of the central office circuit shown, and also having a third winding with an initial bias which is increased during the test for ground conditions of the line as described hereafter; a relay AA connected with the central battery which upon seizure of the circuit shown, provides a balanced battery feed to the line, and will respond to open and closed conditions on the line loop. The central office equipment illustrated further comprises other relays, to be later described in the specification, as being the means for identifying the line ground conditions, if any, detected by the polarized relay PA while the line relay AA responds to openings or closings of the line loop when controlled from the connected substations as the call is being established.

*General circuit arrangements*

In order to simplify the following description of the embodiment of the present invention, it is assumed that line party number 2 is making an outgoing call from his substation. In making this call he establishes a connection by means of an automatic switch train, not shown, which connects his dial impulse spring contacts 12, by way of the tip and ring line conductors, directly with a balanced circuit of the central office equipment. This balanced circuit includes line relay AA and responding to dial impulses as one or more further dial impulse series are transmitted. The balanced circuit is traced from the live battery terminal, descriptively referred to herein only as "battery," of the central battery, through the lower winding of relay AA, the middle or second winding of polarized relay PA, the ring conductor of the line loop including the impulsing springs and the switching equipment, not shown, to the tip conductor where the balanced circuit is further traced through the upper winding, first, of relay PA connected in series with the upper winding of relay AA and back contacts GD–3, of a test-initiating relay GD, to the grounded terminal of the battery. The above-mentioned first and second windings of polarized relay PA are differentially wound and are in mutual opposition in the balanced loop circuit such that polarized relay PA is not operated upon seizure of relay AA. Relay AA operates and closes its contacts AA–1.

Subsequent to seizure of relay AA, the test-initiating relay GD operates in a closed path traced from ground, through control apparatus, not shown, and the lower winding of relay GD to battery. Operated relay GD prepares the test circuit for detecting grounds, if any, on the line. A first of these circuits thereby prepared is traced from the junction of resistor R2 with the resistance R1 path through the initial-biasing lower winding, third, of polarized relay PA. The first prepared path is further traced from the other terminal of resistor R2 through diode D1, back contacts CA–1, of control relay CA, make contacts GD–2, back contacts HD1–5, of another control relay HD1, and through other equipment, not shown, to ground. Operated relay GD furthermore prereset second and third circuits for the initial testing of line ground conditions. The second circuit is the above-traced balanced loop circuit, into which is inserted a resistor R3 by the actuation of make-before-break contact GD–3 of relay GD, whereby the battery ground is transferred into a path further traced through back contacts HD1–7, make contacts GD–4, resistor R3, make contacts AA–1 of the impulse responsive relay AA, then back contacts HD1–4 to a junction with the first described balanced loop circuit including the impulsing spring contacts at the party number 2 substation. The third circuit prepared by operated relay GD is an incomplete unbalanced circuit. This circuit includes a portion of the above described balanced loop circuit and is traced from the junction at the left on the middle winding of polarized relay PA, through back contacts HD1–1, first step "X" make contacts GD–1, of initiating relay GD, through apparatus not shown, to the opened contacts AA–1. The latter will soon be described as being closed and enabling the polarized relay, while in the unbalanced circuit, to test the line for ground conditions.

It will be recalled that party number 2 has not completed the connection, but has merely dialed the digits necessary to seize the central office equipment shown in the drawing, and that the detector circuits have been prepared to test the line for ground conditions. Therefore party number 2 will continue to dial whatever digits are necessary to complete the connection. The following paragraphs will describe circuit arrangements whereby polarized relay PA simultaneously tests for ground line conditions, if any, in the first opening of the line loop and controls relays bringing about a corresponding registration of the condition detected on the line—whether the condition is interpreted as being due to a faulty line, or otherwise as being indicative of the call having been originated by party 2.

*Identification of a faulty line*

Let it be assumed first that the telephone line has a steady ground condition not preventing the establishment of switch train connections for the call but rendering positive party identification impossible.

The fault ground will be detectable by the polarized relay either over the tip or the ring line conductors, but for simplification of this description it is assumed that the steady ground will be detected on the tip line conductor. In the above general description it was indicated that upon seizure of the line relay AA, the test-initiating relay, GD, operated and inserted a resistor R3 into the closed loop path. This resistance path has lowered the holding current through the line relay AA and, as a consequence, upon the first opening of the dial impulsing springs, line relay AA restores faster for enabling its contact springs AA–1 to almost immediately transfer polarized relay PA from the closed loop circuit to the unbalanced loop circuit. While being in this unbalanced circuit polarized relay PA detects the steady ground on the tip line conductor in a path now traced from the tip conductor, through the upper winding of relay PA, upper winding of line relay AA, back contacts HD1–4, back contacts AA–1 of the line relay, through other apparatus, not shown, make contacts GD–1 of the test-initiating relay GD, through back contacts HD1–1 of the control relay HD1, to the above mentioned junction with the closed loop circuit which is further traced through the middle winding of the polarized relay PA serially connected with the lower winding of the line relay AA to battery. While in this testing arrangement, the first and second windings of the polarized relay PA, which were differentially opposing in the balanced circuit, are now connected in a series aiding fashion whereby they cooperatively aid the third winding, in increased biased condition, for operating polarized relay PA until the line relay AA again operates and opens the path at its back contacts AA–1.

In response to the first line loop opening relay AA restores and at its back contacts AA–2 closes a path to relay CA. Relay CA operates and remains operated until released by other apparatus, not shown, connected in the path with its winding. Operated relay CA, by means of its make contacts CA–2, prepared a path which was completed through contacts PA–1 of operated polarized relay PA upon detecting the steady ground condition on the line. This closed circuit is traced from ground, make contacts GD–3 of operated test-initiating relay GD, back contacts HD1–7, make contacts CA–2, make contacts PA–1, back contacts HD1–8, through the winding of identification relay PB to battery. Relay PB operates to the first of its two steps and closes its "X" contacts PB–1, whereby the relay further operates to its second step and remains held over an obvious path to ground.

Operated relay CA also closed a path whereby control relay HD1 operated. This path is traced from ground, through other apparatus not shown, back contacts HD1–5, make contacts GD–2, make contacts CA–1, and through the winding of relay HD1 to battery. Relay HD1 operates to its first step and closes its "X" make contact HD1–2 whereby it operates to its second step and then becomes held until released by other apparatus in its path, not shown. Upon the operation of relay HD1, the above-described bias increasing path for the third winding of polarized relay PA is transferred from its back contacts HD1–5 to the make contact arrangement.

Operated relay HD1 also disables the unbalanced circuit at its back contacts HD1–1 and through other contacts prepares circuits for testing in the second test period in addition to registering the condition detected on the line when the line relay AA again becomes operated and closes its make contacts AA–1. The registration path is traced from ground through back contacts HD–3, make contacts HD1–3, make contacts AA–1, make contacts HD1–6, make contacts GD–4, make contacts CA–2, make contacts PA–1, yet operated, make contacts HD1–8, make contacts PB–2, back contacts PC–3, back contacts GT, through the winding of the GT relay to battery. Relay GT operates to the first of its two steps and closes its "X" make contacts GT–1 whereby relay GT operates to its second step and becomes held. At the end of the second testing period test-finished relay HD operates upon closure of a path traced from ground, through control apparatus, not shown, and its winding to battery. Operated relay HD closes make contacts HD–4, but apparatus, not shown, in their path controlled by relay GT prevents registration of the fault identification. Operated relay GT closes its make contacts GT–2 to complete a path to control fault indicators or other apparatus used to identify faulty line conditions.

*Identification of line party number two*

In the above description dealing with the identification of a faulty line it was assumed that line party number two was establishing connections for the outgoing call from a substation dial and that the steady fault ground was detected on the line rather than the resistance ground by which party number two is identified. In the present description, it will be assumed that the steady ground is not present on the line conductors and that the cam 16, operated shunt springs apply a resistance ground to the tip conductor extending to the central office detecting equipment. In the same manner as has been described above, the polarized relay PA detects this ground after being transferred into the unbalanced circuit so that its series aiding windings, together with the increased biasing of its third winding, cause relay PA to operate in the open loop period of the dial. In a like manner, operated relay PA closed its make contacts PA–1 to complete the circuit of the identifying relay PB. Relay PB operates to its first and second steps as described before. The upper winding of relay PA is switched into another closed loop path by make contacts HD1–4 when control relay HD1 operates. While the upper winding of the relay is connected in this manner relay PA will not operate because of the shunting grounds on either side of that winding if the identifying resistance ground is connected to the tip conductor. At the end of the line testing period, test-finished relay HD operates by closure of the path traced from ground, through other equipment, not shown, and the winding of that relay to battery. Operated relay HD closes its make contacts HD–4 in the series path traced from ground through back contacts PC4, and make contacts PB–3 of the operated identifying relay PB, to substation party register equipment, not shown. The latter registers that party number two on the line has been identified as the party making the call. Operated relay HD closes make contacts HD–1 and HD–2 and thereby disables the detecting relay PA by shunting of its upper and middle windings.

*Identification of line party number one*

The substation for party number one employs a regular dial SP1, without means for applying an identifying ground to the line conductors. Therefore polarized relay does not operate at any time during the testing periods. As in the case of the above-described identification of party number two, test finish relay HD operates at the end of the testing period. In the call being described, operated relay HD closes its make contacts HD–4 in a second series path traced from ground, through back contacts PC–4, and back contacts PB–3 to the corresponding substation register equipment, not shown. The latter registers that party number one on the line has been identified as the party making the call. In the same described manner, operated relay HD closes its make contacts HD–1 and HD–2 for disabling the detecting relay PA.

*Identification of line party number three*

It has been mentioned above that party number three has a dial SP3, with cam operated spring contacts 17, for applying an identifying ground to the line conductors. At a predetermined opening of the line loop by the impulsing spring contacts 12, the cam spring contacts apply a ground which lasts into the next closing of the line loop. Under this condition the identifying ground is detectable over the closed line loop rather than any specific line conductor as was the case in the above-described identification of line party number two. According to the present embodiment of this invention, the identifying ground is detected by the polarized relay during the second loop closure after the line was tested for a faulty condition during the first opening of the line loop. As a means of simplifying the description of the present identification arrangement, it is stated that the following relays are in an operated condition: test-initiating relay GD, control relay CA, control relay HD1, and that line relay AA is included in the second mentioned balanced loop circuit which includes make contacts HD—4 of the above-mentioned control relay HD1. Under these circumstances, the operated cam springs apply the party identifying ground simultaneously to both tip and ring line conductors. Because of this grounded condition on the line conductors, the upper winding of the polarized relay PA is ground shunted and made differentially ineffective, while the ground applied on the ring conductor causes the middle winding to become energized and aid the bottom winding for operating relay PA. With relay PA operated, a path can be traced through back contacts HD–3, make contacts HD1–3, make contacts AA–1, make contacts HD1–6, make contacts GD–4, make contacts CA–2, make contacts PA–1 operated, make contacts HD1–8, back contacts PB–2, and through the winding of identifying relay PC to battery. Relay PC operates, and upon operation of the test-finish relay HD at the end of the testing period, a path can be traced from ground, through other equipment, not shown, make contacts HD–4, make contacts PC–4, back contact PB–4 to the substation register equipment, not shown. The latter registers that party number three on the line has been identified as the party making the call. As previously described, operated relay HD closes make contacts HD–1 and HD–2 and thereby disables the polarized relay PA from detecting any further ground conditions on the line.

*Identification of line party number four*

The operation of the testing arrangement for detecting the identifying ground applied on the line conductors by the spotter cam 15, springs as party number four makes an outgoing call from his dial SP4 is the same as described above in connection with the party number three call. The identifying ground for party number four is applied in a like manner to the line conductors but during a designated closed loop so that the ground condition lasts into the next opening of the line loop.

In the present case, line relay AA detects the designated closed loop condition on the line and operates its make contacts AA–1 in the described path by which identifying relay PC became operated. Relay PC operated closes its make contacts PC–1 in a path now traced from ground, back contacts HD–3, make contacts HD1–3, back contacts AA–1 of the detecting line relay, through other apparatus, not shown, to the make contacts PC–1, and the winding of identifying relay PB to battery. Relay PB operates its "X" contacts PB–1 and becomes fully operated and held over the previously described path to ground. It is noted that the operation of identifying relay PB in this case is not dependent upon the condition of the polarized relay PA as it detects grounds on the line conductors, but rather it operates upon the release of the line detecting relay AA as it detects an opening of the line loop. At the end of the testing period, test-finish relay HD operates in the same manner as has been described above. However, in this case, the closing of its make contacts HD1–4 closes a path traced through make contacts PC–4, make contacts PB–4, to the substation register equipment, not shown. Therefore the operated condition of the identifying relays PC and also PB is an indication that party number four is establishing the call. Operated relay HD also closes make contacts HD–1 and HD–2 and disables the detecting relay PA as has been described.

From what has been said above, it will be understood that grounded line conditions on telephone lines are detected without the aid of an auxiliary battery additional to the regular exchange battery. For another thing it will be clear that the circuit arrangement provides a balanced battery feed from the central office equipment to the calling line. It will also be found that the circuit arrangement includes a differentially wound polarized relay which detects a faulty line in the same manner as when detecting a ground condition identifying a party making the call.

Having fully described the features and aspects of my invention, what I consider to be new will be pointed out in the appended claims.

What is claimed is:

1. In a telephone system, a two-conductor subscriber line, one or more substations connected to said line, central office equipment connected to said line, a central battery having a live terminal and a grounded terminal, impulse contacts at said substation for opening and closing a loop circuit over said line to said central battery by way of said central office equipment, said equipment including: first means comprising a fast-acting line relay for detecting closed and open conditions of said loop circuit, second means comprising a polarized relay for detecting ground conditions on said line, and means for increasing the sensitivity of said polarized relay while testing said line for said ground conditions.

2. The combination in a telephone system as claimed in claim 1, wherein said polarized relay has first and second differentially wound windings which are normally included in a mutually opposing sense in said loop circuit with said loop circuit being fed in balanced fashion from both of said battery terminals, and wherein said central office equipment includes contacts effective upon the release of said line relay responsive to the first opening of said line loop on an impulse series for momentarily transferring said polarized relay from said balanced circuit into an unbalanced circuit extending from said ground, if any, on one of said line conductors by way of said line relay and said two windings of the polarized relay in series aiding relation to said live terminal of said battery.

3. The combination in a telephone system as claimed in claim 2, wherein said polarized relay has a third winding normally energized to provide an initial bias, wherein said means for increasing the sensitivity of said polarized relay comprises means for increasing said bias; and ground test initiating means operated subsequent to seizure of said central office equipment for connecting said bias increasing means in circuit with said third winding.

4. The combination in a telephone system as claimed in claim 3, wherein there is provided resistance means, and wherein said ground test initiating means inserts said resistance means into said balanced circuit including said line relay to bring about faster release of said line relay.

5. The combination in a telephone system as claimed in claim 2, wherein there is provided control means operated after the lapse of a predetermined time following said first release of the line relay for transferring said polarized relay back into said balanced circuit.

6. The combination in a telephone system as claimed in claim 5, wherein each of said substations includes a dial having said loop-opening-and-closing-contacts and wherein at least one of said substation dials further has auxiliary contacts for applying a ground to said line at a predetermined time during said impulse series to facilitate identification of said substation.

7. The combination in a telephone system as claimed in claim 6, wherein said central office equipment further includes means for indicating the presence of a faulty ground on said line and other means for identifying said substation, said identifying means being operated responsive to the operation of said polarized relay in said unbalanced circuit, and said fault-indicating means being additionally operated upon operation of said control means if said polarized relay is still operated at that time.

8. The combination in a telephone system as claimed in claim 7, wherein said central office equipment includes second identifying means operated if subsequent to the operation of said control means said polarized relay operates with said first identifying means in unoperated conditions and said line relay in operated conditions, thereby to identify a further station on said line.

9. The combination in a telephone system as claimed in claim 8, wherein said central office equipment includes another circuit for operating said first identifying means, said first identifying means being operated in said other circuit if subsequent to the operation of said control means said line releases with said second identifying means operated.

References Cited

UNITED STATES PATENTS 2,785,228 3/1957 Gulbrandsen ------- 179—17.1

KATHLEEN H. CLAFFY, *Primary Examiner.*

H. ZELLER, *Assistant Examiner.*